US00RE47028E

(19) United States
(12) Reissued Patent
Yamano et al.

(10) Patent Number: US RE47,028 E
(45) Date of Reissued Patent: Sep. 4, 2018

(54) INFORMATION PROCESSING APPARATUS, METHOD AND COMPUTER READABLE MEDIUM FOR FIXING AN INPUT POSITION ACCORDING TO AN INPUT OPERATION

(71) Applicant: SONY CORPORATION, Tokyo (JP)

(72) Inventors: Ikuo Yamano, Tokyo (JP); Takuro Noda, Tokyo (JP); Tetsuo Ikeda, Tokyo (JP)

(73) Assignee: SONY CORPORATION, Tokyo (JP)

(21) Appl. No.: 15/190,831

(22) Filed: Jun. 23, 2016

Related U.S. Patent Documents

Reissue of:
(64) Patent No.: 8,780,075
Issued: Jul. 15, 2014
Appl. No.: 13/183,623
Filed: Jul. 15, 2011

(30) Foreign Application Priority Data

Sep. 2, 2010 (JP) ..... 2010-196815

(51) Int. Cl.
*G06F 3/045* (2006.01)
*G06F 3/041* (2006.01)
*G06F 3/0488* (2013.01)
*G06F 3/023* (2006.01)

(52) U.S. Cl.
CPC ..... *G06F 3/0414* (2013.01); *G06F 3/0236* (2013.01); *G06F 3/0416* (2013.01); *G06F 3/04886* (2013.01); *G06F 2203/04105* (2013.01)

(58) Field of Classification Search
CPC .... G06F 3/0236; G06F 3/0414; G06F 3/0416; G06F 3/04886; G06F 2203/04105
USPC ..... 715/700–702, 707, 860, 856, 864; 345/156, 157, 160, 173–178
See application file for complete search history.

(56) References Cited

U.S. PATENT DOCUMENTS 5,063,407 A * 11/1991 Takagi ..... H04N 1/4072 355/68
5,432,531 A * 7/1995 Calder ..... G06F 3/04883 345/173
5,511,983 A * 4/1996 Kashii ..... A63F 13/00 345/179
5,621,438 A * 4/1997 Kamimura ..... G06F 1/1613 345/156

(Continued)

FOREIGN PATENT DOCUMENTS

JP 11-119882 4/1999

OTHER PUBLICATIONS

U.S. Appl. No. 13/107,308, filed May 13, 2100, Yamamoto, et al.

*Primary Examiner* — Adam L Basehoar
(74) *Attorney, Agent, or Firm* — Oblon, McClelland, Maier & Neustadt, L.L.P.

(57) ABSTRACT

Provided is an information processing apparatus including an input position acquisition unit, a depressing force acquisition unit and an input control unit. An input position acquisition unit obtains an input position detected with respect to an input operation. A depressing force acquisition unit obtains a depressing force detected with respect to the input operation. An input control unit fixes the input position as a position of an input candidate in response to a timing at which an increase amount of the depressing force has exceeded a first threshold value, at a stage prior to an input candidate determination operation of determining the input candidate as input information.

7 Claims, 13 Drawing Sheets

(56) References Cited

U.S. PATENT DOCUMENTS

| | | | | |
|---|---|---|---|---|
| 5,675,329 | A * | 10/1997 | Barker | G06F 3/0233 341/22 |
| 6,072,474 | A * | 6/2000 | Morimura | G06F 3/04892 345/173 |
| 7,629,966 | B2 * | 12/2009 | Anson | G06F 3/0488 178/18.01 |
| 8,878,793 | B2 * | 11/2014 | Sasaki | G06F 3/016 345/156 |
| 2001/0055195 | A1 * | 12/2001 | Suzuki | G06F 3/0383 361/679.08 |
| 2006/0053387 | A1 * | 3/2006 | Ording | G06F 3/04883 715/773 |
| 2007/0152976 | A1 * | 7/2007 | Townsend | G06F 3/0416 345/173 |
| 2008/0251368 | A1 * | 10/2008 | Holmberg | H01H 13/78 200/534 |
| 2008/0297475 | A1 * | 12/2008 | Woolf | G06F 3/0233 345/163 |
| 2009/0009482 | A1 * | 1/2009 | McDermid | 345/173 |
| 2010/0017710 | A1 * | 1/2010 | Kim | G06F 3/0414 715/702 |
| 2011/0050576 | A1 * | 3/2011 | Forutanpour et al. | 345/168 |
| 2011/0050630 | A1 * | 3/2011 | Ikeda | 345/174 |
| 2011/0080369 | A1 * | 4/2011 | Chang et al. | 345/174 |
| 2011/0083110 | A1 * | 4/2011 | Griffin | G06F 3/04886 715/863 |
| 2011/0109573 | A1 * | 5/2011 | Deslippe et al. | 345/173 |
| 2011/0279380 | A1 * | 11/2011 | Weber | G06F 3/016 345/173 |
| 2012/0088553 | A1 * | 4/2012 | Nunes | 455/566 |

* cited by examiner

INFORMATION PROCESSING APPARATUS, METHOD AND COMPUTER READABLE MEDIUM FOR FIXING AN INPUT POSITION ACCORDING TO AN INPUT OPERATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present disclosure relates to an information processing apparatus, an input control method of the information processing apparatus, and a program. More specifically, the disclosure relates to input control based on a depression operation.

In recent years, various electronic apparatuses such as cellular phones, personal digital assistants, personal computers, and car navigation systems which employ a touch panel or a touch pad for input operation have been put into practical use. In these apparatuses, it is a common practice to detect a position of touch using a tap operation with a stylus or an operating finger to perform selection and an input determination operation of a menu button, a software keyboard key, or the like. However, when the selection and the input determination are performed by the tap operation, the size of the button is small with respect to the size of the operating finger or the stylus, so that erroneous depression may often occur.

In order to cope with this problem, there is proposed a method using a pressure-sensitive sensor mounted on an apparatus. In this method, depression of a virtual key on a software keyboard is detected by the pressure-sensitive sensor. While obtaining tactile feedback using the depressing force of the virtual key, key input is performed (refer to JP-T-1999-119882, for example). In the operation method disclosed in JP-T-1999-119882, only leading kana characters (which are "a", "ka", "sa", "ta", "na", "ha", "ma", "ya", "ra", "wa") in a Japanese kana table are assigned to respective virtual keys. When a certain leading kana character (such as "na") is touched from among the leading kana characters, subordinate kana characters (such as "no" "ni", "nu", "ne", and "no") belonging to the touched leading kana character of the virtual key are displayed. According to JP-T-1999-119882, pressure thresholds are provided in a step-by-step manner to select the respective subordinate kana characters. Then, by comparing a pressure of depressing the virtual key by an operating finger with each of the pressure thresholds provided in the step-by-step manner, one of the subordinate kana characters belonging to the touched virtual key is selected.

According to the operation method disclosed in JP-T-1999-119882, an operator needs to adjust a depressing force for selecting a desired one of the subordinate kana characters, in a step-by-step manner. This adjustment operation leads to a character selection error, and a burden on the operating finger at a time of input is also great.

SUMMARY

On contrast therewith, there is also proposed an input method using a touch panel capable of detecting a proximity state of a button. In this method, a button in a proximity and preliminary selection state is presented to an operator, using a change in display. When the button transitions from the proximity state to a touch state, for example, an input determination operation of the button is performed. With this arrangement, after confirming that the button intended to be input has been selected, input determination of the button may be made. Accordingly, a touch error as described above may be reduced. Further, even if the size of each button is small with respect to the size of an operating finger or a stylus, the selection operation and the input determination operation of the button may be correctly performed.

However, when the operator performs the input determination operation by depression of or access to the button in the preliminary selection state by his operating finger after confirming the button in the preliminary selection state, the position of the operating finger may unintentionally change. In that case, according to the input control method described above, the operator may unintentionally input a different button which is present in the proximity of the button in the preliminary selection state.

This problem may be manifest especially when the size of a button is smaller than the size of the operating finger, or when a pitch of buttons is narrow as in the case of a keyboard screen on which buttons are arranged in the form of tiles. To take an example, when the input determination operation is performed by depressing an "e" button of a software keyboard displayed on the screen of a personal digital assistant 10, as shown in FIG. 2, an operator increases the depressing force of his finger. At that point, the position of the finger may deviate in a direction toward the base of the finger. Consequently, the position of the finger may change to a "d" button when depression of the "e" button is determined. As a result, input of the "d" button may be determined.

The present disclosure has been made in view of the abovementioned problems. It is desirable to provide an information processing apparatus, an input control method of the information processing apparatus, and a program in which erroneous input button depression due to an input position deviation at a time of an input operation may be prevented, and an efficient and high-speed input operation may be performed by a desired depression operation.

According to an embodiment of the present disclosure, there is provided an information processing apparatus including: an input position acquisition unit which obtains an input position detected with respect to an input operation; a depressing force acquisition unit which obtains a depressing force detected with respect to the input operation; and an input control unit which fixes the input position as a position of an input candidate in response to a timing at which an increase amount of the depressing force has exceeded a first threshold value, at a stage prior to an input candidate determination operation of determining the input candidate as input information.

According to another embodiment of the present disclosure, there is provided an input control method of an information processing apparatus, including: obtaining an input position detected with respect to an input operation; obtaining a depressing force detected with respect to the input operation; and fixing the input position as a position of an input candidate in response to a timing at which an increase amount of the depressing force has exceeded a first threshold value, at a stage prior to an input candidate determination operation of determining the input candidate as input information.

According to another embodiment of the present disclosure, there is provided a program for causing a computer to execute functions of: an input position acquisition unit which obtains an input position detected with respect to an input operation; a depressing force acquisition unit which obtains a depressing force detected with respect to the input operation; and an input control unit which fixes the input position as a position of an input candidate in response to a timing at which an increase amount of the depressing force has exceeded a first threshold value, at a stage prior to an input candidate determination operation of determining the input candidate as input information.

As described above, according to the present disclosure, erroneous input button depression due to an input position deviation at a time of an input operation may be prevented, and an efficient and high-speed input operation may be implemented by a desired depression operation.

DETAILED DESCRIPTION OF THE EMBODIMENT(S)

Figure 1:
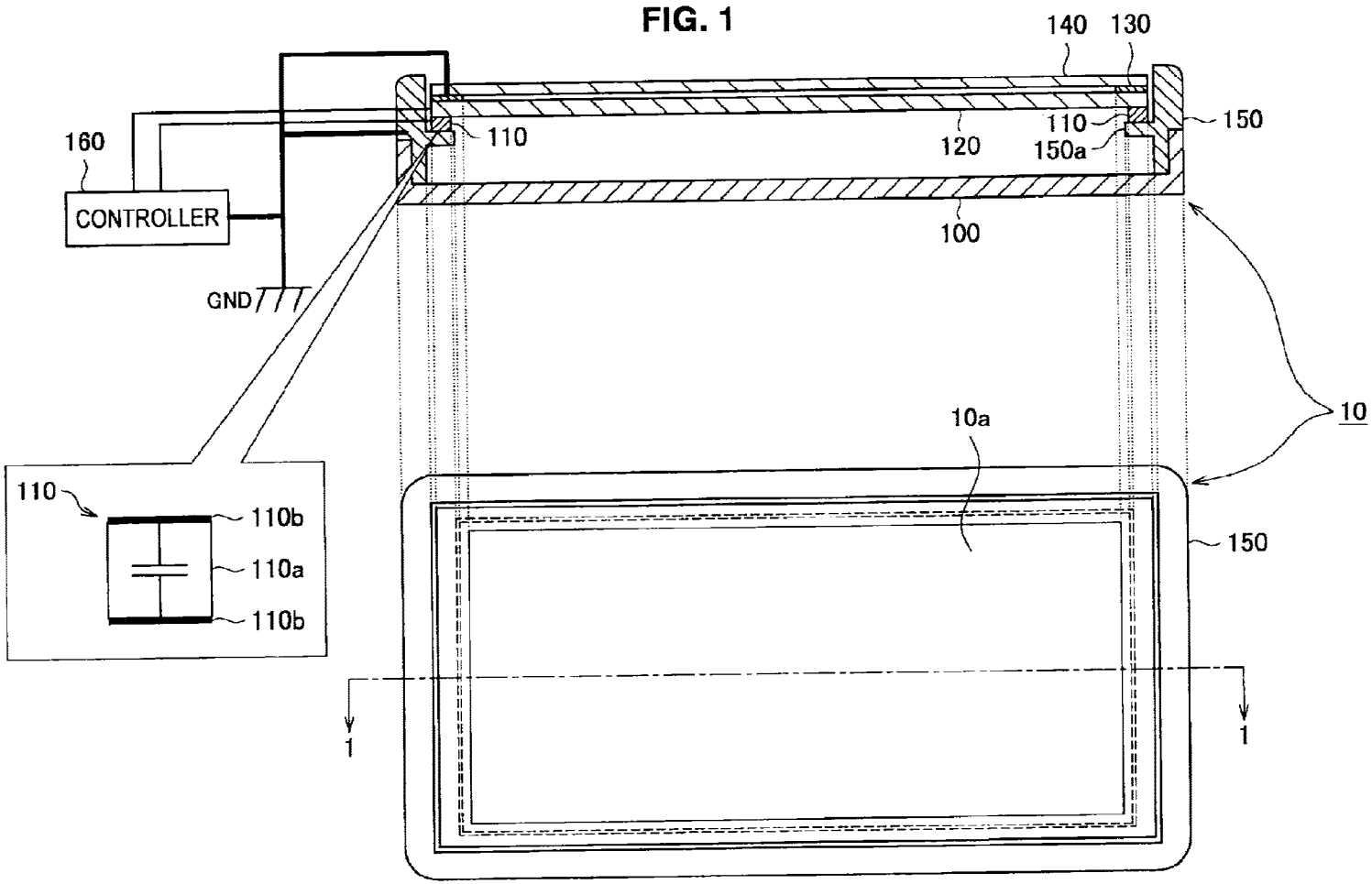
FIG. 1 includes diagrams showing a schematic configuration of a mobile apparatus according to first to third embodiments of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments of the present disclosure will be described in the following order.

<First Embodiment>
[1-1. Hardware Configuration of Mobile Apparatus]
[1-2. Functional Configuration of Mobile Apparatus]
[1-3. Input Control Process Example 1]
[1-4. Input Control Process Example 2]
[1-5. Operation of Mobile Apparatus]
(Input Control Process)
<Second Embodiment>
[2-1. Operation of Mobile Apparatus]
(Input Control Process)
<Third Embodiment>
[3-1. Operation of Mobile Apparatus]
(Input Control Process)

First Embodiment

1-1. Hardware Configuration of Mobile Apparatus

First, a hardware configuration of a mobile apparatus according to a first embodiment of the present disclosure will be described with reference to FIGS. 1 and 2. A diagram illustrated in the lower portion of the page of FIG. 1 is a plan view of a mobile apparatus 10 including a display screen 10a. As the display screen 10a, a liquid crystal display (LCD: Liquid Crystal Display), an organic electroluminescence display (organic EL, OELD: Organic Electroluminescence Display) or the like, for example, may be employed.

The mobile apparatus 10 is an example of an information processing apparatus capable of receiving information by touching or depressing the display screen 10a. The information processing apparatus may be a PC (Personal Computer), a cellular phone, a smart phone, a portable music player, a personal digital assistant (PDA: Personal Digital Assistant), a game apparatus, or a digital household appliance.

A diagram illustrated in the upper portion of the page of FIG. 1 is a sectional view of the mobile apparatus 10 shown in the diagram in the lower portion of the page of FIG. 1, taken along a line 1-1. As shown in the diagram in the upper portion of the page of FIG. 1, the mobile apparatus 10 includes a base member 100, a pressure-sensitive sensor 110, a touch panel 120, an electrically conductive vapor-deposited film 130, a top plate 140, and an electrically conductive housing 150.

The base member 100 constitutes the bottom portion of the mobile apparatus 10, and is formed of a resin substrate or the like, for example. The pressure-sensitive sensor 110 is in the shape of a sheet, and is shaped like a substantially rectangular frame. Referring to a diagram on the left side of the page of FIG. 1 in which the pressure-sensitive sensor 110 has been enlarged, the pressure-sensitive sensor 110 has a structure in which a pressure-sensitive electrically conductive rubber 110a is sandwiched between two sheet panels 110b that form electrode surfaces.

The touch panel 120 is disposed directly on the pressure-sensitive sensor 110. The touch panel 120 is a touch panel of a capacitance type, and detects a touch position of an operating finger. A display panel not shown is disposed between the touch panel 120 and the base member 100.

Figure 2:
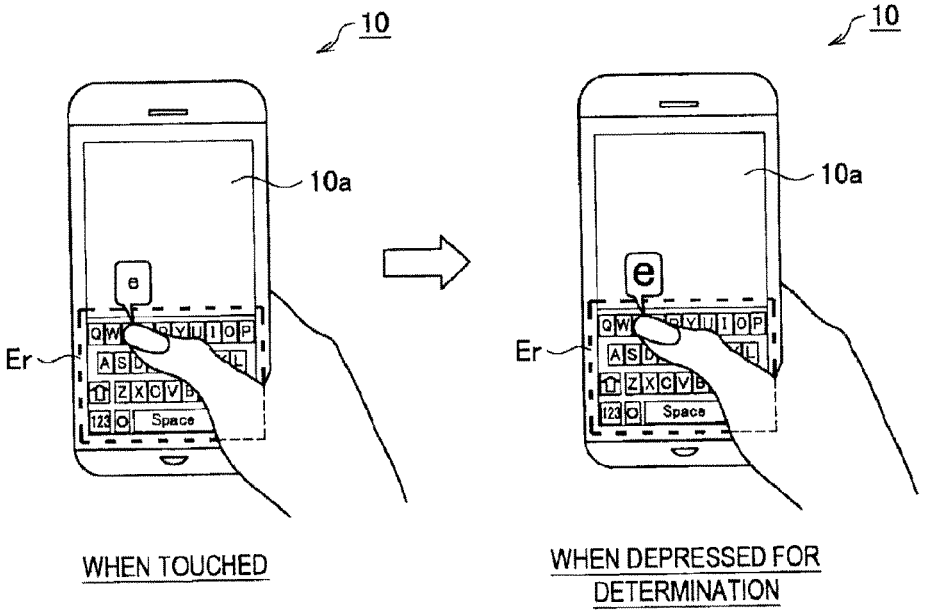
FIG. 2 includes diagrams showing an example of an input operation of the mobile apparatus according to the first to third embodiments.

As shown in FIG. 2, there is a key input region Er for displaying a software keyboard on the display screen 10a of the display panel. In this embodiment, the software keyboard with a QWERTY key arrangement capable of receiving "kana" characters and English alphabet characters is displayed in the key input region Er. An operator causes an operating finger to touch or depress a predetermined portion of the touch panel 120 based on the software keyboard displayed on the display panel 120. The touch panel 120 detects X and Y coordinates of the input position of the touch panel the operating finger has touched. The X and Y coordinates detected by the touch panel 120 are transmitted to a controller 160.

The electrically conductive vapor-deposited film 130 is a thin metal film formed in the shape of a frame by vapor deposition, and covers an upper surface of the pressure sensitive sensor 110 via the touch panel 120. The electrically conductive vapor-deposited film 130 does not exist on a region other than a peripheral edge portion of the touch panel 120. Thus, the electrically conductive vapor-deposited film 130 does not affect position detection by the touch panel 120.

The top plate 140 is formed above the touch panel 120 with the electrically conductive vapor-deposited film sandwiched between the top plate 140 and the touch panel 120. The top plate 140 protects the touch panel 120 and prevents the touch panel 120 from being scratched. The top plate 140 is formed of a glass substrate or a resin substrate, for example. The finger depresses the touch panel 120 via the top plate 140.

The electrically conductive housing 150 is a frame body surrounding the outer periphery of the touch panel 120, and is fitted in the base member 100. The electrically conductive housing 150 is formed of an electrically conductive material mainly made of aluminum, an electrically conductive rubber, electrically conductive carbon, or the like, for example, and is connected to the ground. With this arrangement, the electrically conductive housing 150 includes a function of blocking electrical connection between the operating finger which comes close to the mobile apparatus 10 from a side surface of the mobile apparatus 10 and the pressure-sensitive sensor 110. A projecting portion 150a projecting toward an inside of the electrically conductive housing 150 is formed at the center of an inner wall of the electrically conductive housing 150. The pressure-sensitive sensor 110, the touch panel 120, the electrically conductive vapor-deposited film 130, and the top plate 140 are laminated in this stated order, and are disposed inside the electrically conductive housing 150, being supported by the projecting portion 150a of the electrically conductive housing 150. The projecting portion 150a of the electrically conductive housing 150 includes a function of blocking electrical connection between the pressure-sensitive sensor 110 and the operating finger which has come close from a bottom direction of the mobile apparatus 10.

When the pressure-sensitive electrically conductive rubber 110a deforms with respect to depression of the display surface by the operating finger, the pressure-sensitive sensor 110 detects electrical conduction of the portion of deformation of the pressure-sensitive electrically conductive rubber, thereby detecting a depressing force. The value of detection by the pressure-sensitive sensor 110 is transmitted to the controller 160 and is converted to an electrical signal indicating the depressing force (depression pressure). An insulator not shown is formed on the surface of each sheet panel 110b. The controller 160 is a microprocessor included in the mobile apparatus 10.

[1-2. Functional Configuration of Mobile Apparatus]

Figure 3:
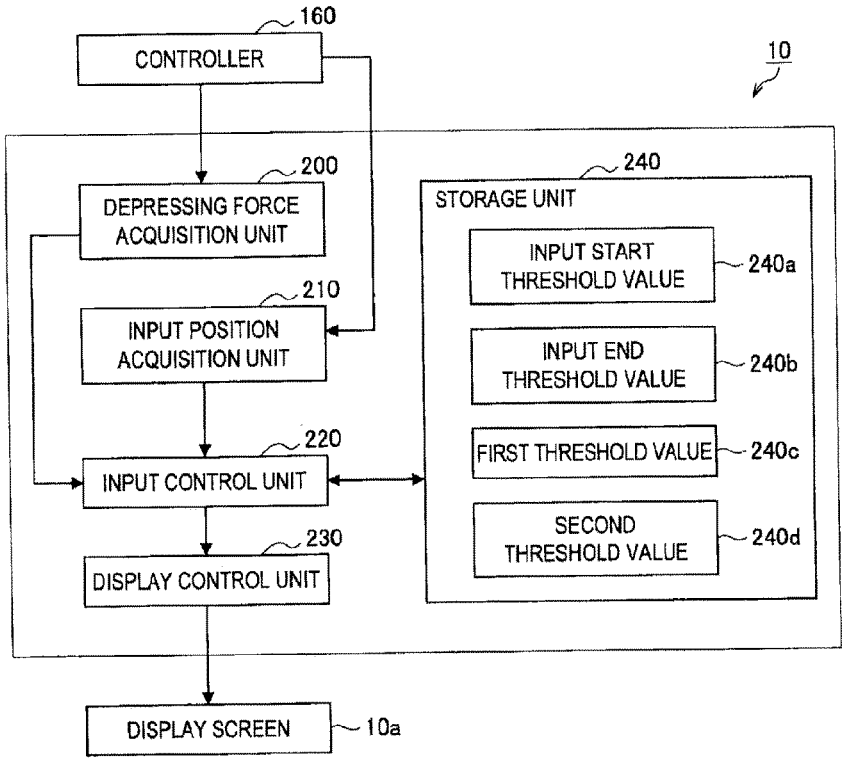
FIG. 3 is a functional configuration diagram of the mobile apparatus according to the first to third embodiments.

A functional configuration of the mobile apparatus 10 will be described now with reference to FIG. 3. The mobile apparatus 10 includes a depressing force acquisition unit 200, an input position acquisition unit 210, an input control unit 220, a display control unit 230, and a storage unit 240.

The depressing force acquisition unit 200 obtains a depressing force detected with respect to an input operation. When performing an input operation, a user causes an operating finger to touch a predetermined position on the touch panel, and depresses the predetermined position. When a pressure is applied to the top plate 140 (touch panel 120) by depression by the finger, the pressure-sensitive electrically conductive rubber 110a deforms (contracts) according to the pressure. When the pressure-sensitive electrically conductive rubber 110a contracts, a capacitance between the electrodes changes. The capacitance of the pressure-sensitive sensor 110 is transmitted to the controller 160 connected to the pressure-sensitive sensor 110, and is converted to an electrical signal indicating the depressing force (depression pressure). The electrical signal obtained by the conversion is transmitted to the depressing force acquisition unit 200 from the controller 160. In this manner, the depressing force acquisition unit 200 acquires the depressing force detected with respect to the input operation.

The input position acquisition unit 210 acquires the position of input detected with respect to the input operation. When performing the input operation, the user causes the operating finger to touch the predetermined position on the touch panel. The touch panel 120 detects X and Y coordinates touched by the operating finger, as the position of input. The X and Y coordinates detected by the touch panel 120 are transmitted to the input position acquisition unit 210 via the controller 160. In this manner, the input position acquisition unit 210 obtains the position of input detected with respect to the input operation.

The input control unit 220 fixes the position of input as the position of an input candidate, in response to a timing at which an increase amount of the depressing force has exceeded a first threshold value, at a stage prior to an input candidate determination operation of determining the input candidate as input information. The operation prior to the input candidate determination operation and the input candidate determination operation will be described later.

The display control unit 230 controls information to be displayed on the display screen 10a. To take an example, the display control unit 230 may perform control such that, when the operating finger has touched the touch panel 120, a pop-up display of a character "e" at the position of touch is performed, as shown in a diagram on the left side of the page of FIG. 2. Further, the display control unit 230 may perform control such that, when the operating finger is depressed for determination, the pop-up display of the character "e" at the position of depression is highlighted, as shown in a diagram illustrated on the right side of the page of FIG. 2, for example. In addition, the display control unit 230 may change screen display according to the operation by the operating finger.

The storage unit 240 stores an input start threshold value 240a, an input end threshold value 240b, a first threshold value 240c, a second threshold value 240d, and the like, as parameters necessary for the input candidate determination operation and the operation prior to the input candidate determination operation.

Actually, the mobile apparatus 10 described above includes a CPU, a RAM, a non-volatile memory, and the like not shown, and each of the functions of the mobile apparatus 10 is executed by the CPU. Likewise, the controller 160 also includes a CPU, a RAM, a non-volatile memory, and the like not shown. Information on the depressing force and the coordinates of the input position transmitted from the controller 160 is stored in the RAM and the non-volatile memory. The CPU analyzes the operation of the operating finger, based on the depressing force and the X and Y coordinates (of the input position) stored in the RAM and the like. The CPU controls an input operation to the mobile apparatus 10 based on the analyzed operation of the operating finger.

[1-3. Input Control Process Example 1]

Figure 4:
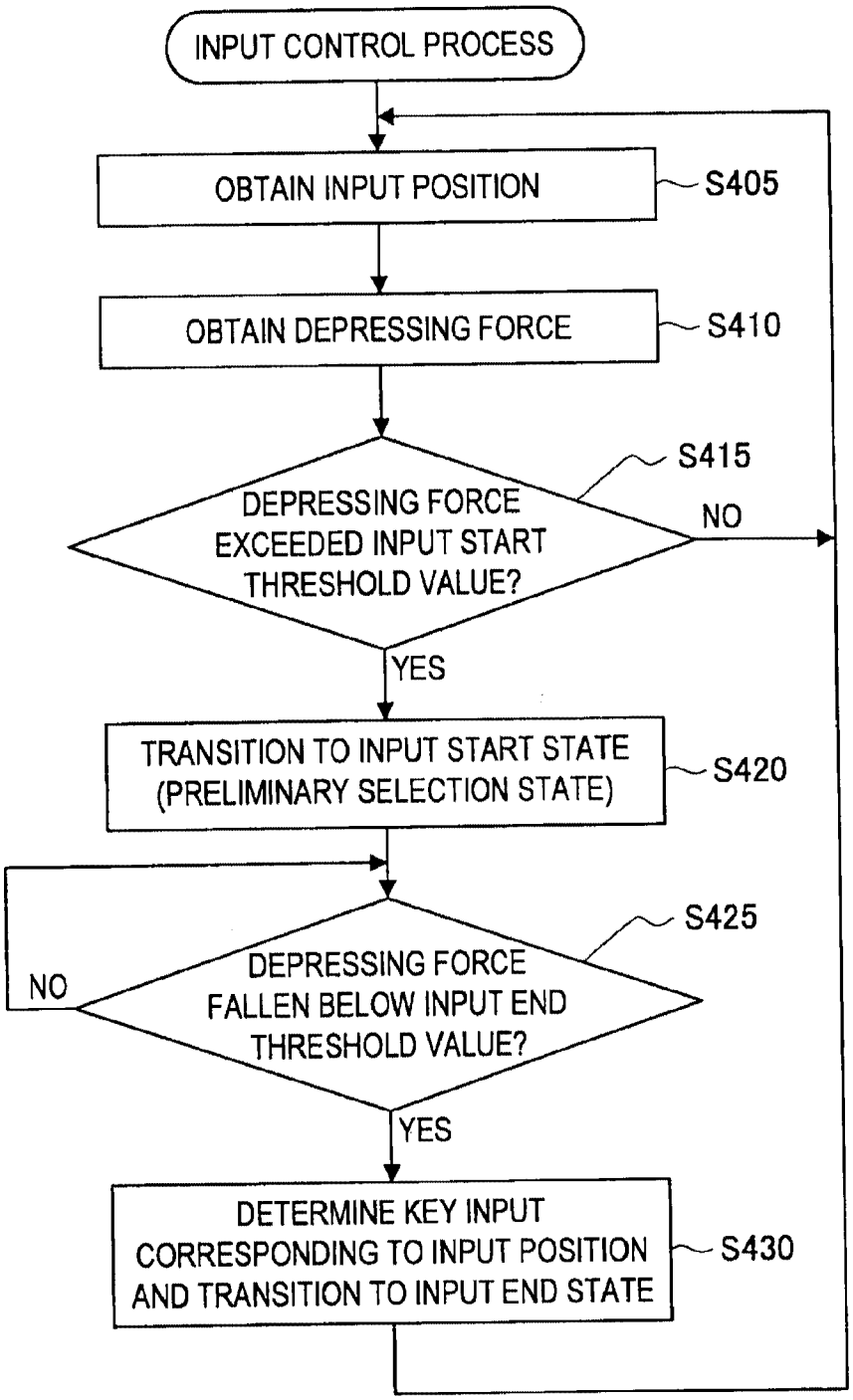
FIG. 4 is a flowchart showing an input control process example 1.
Figure 5:
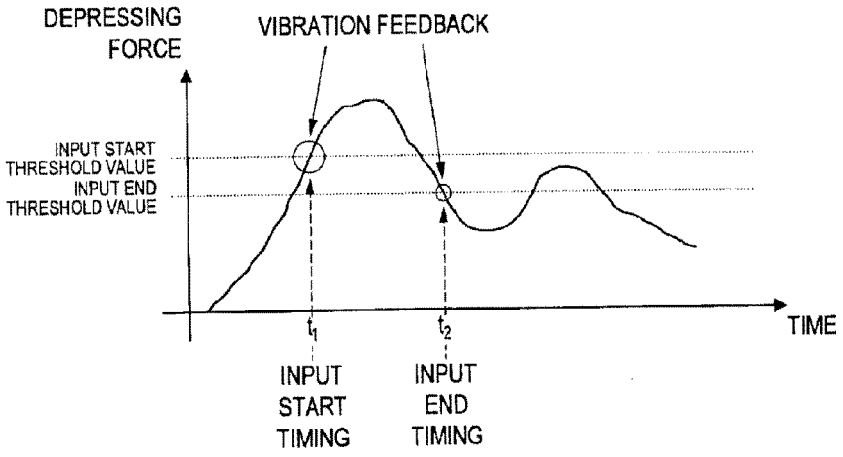
FIG. 5 is a graph for explaining a transition of a state of a selected input candidate in the input control process in FIG. 4.
Figure 6:
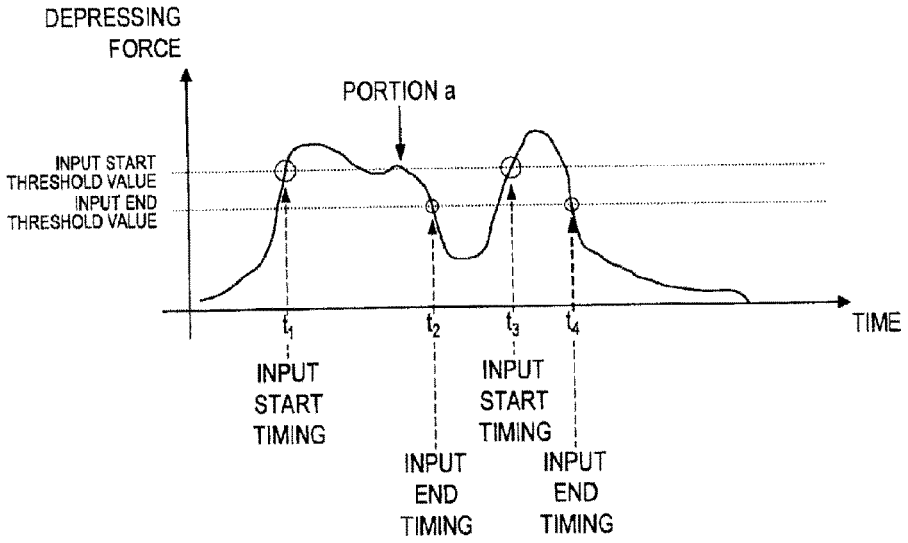
FIG. 6 is a graph for explaining a transition of a state of the selected input candidate in the input control process in FIG. 4.
Figure 7:
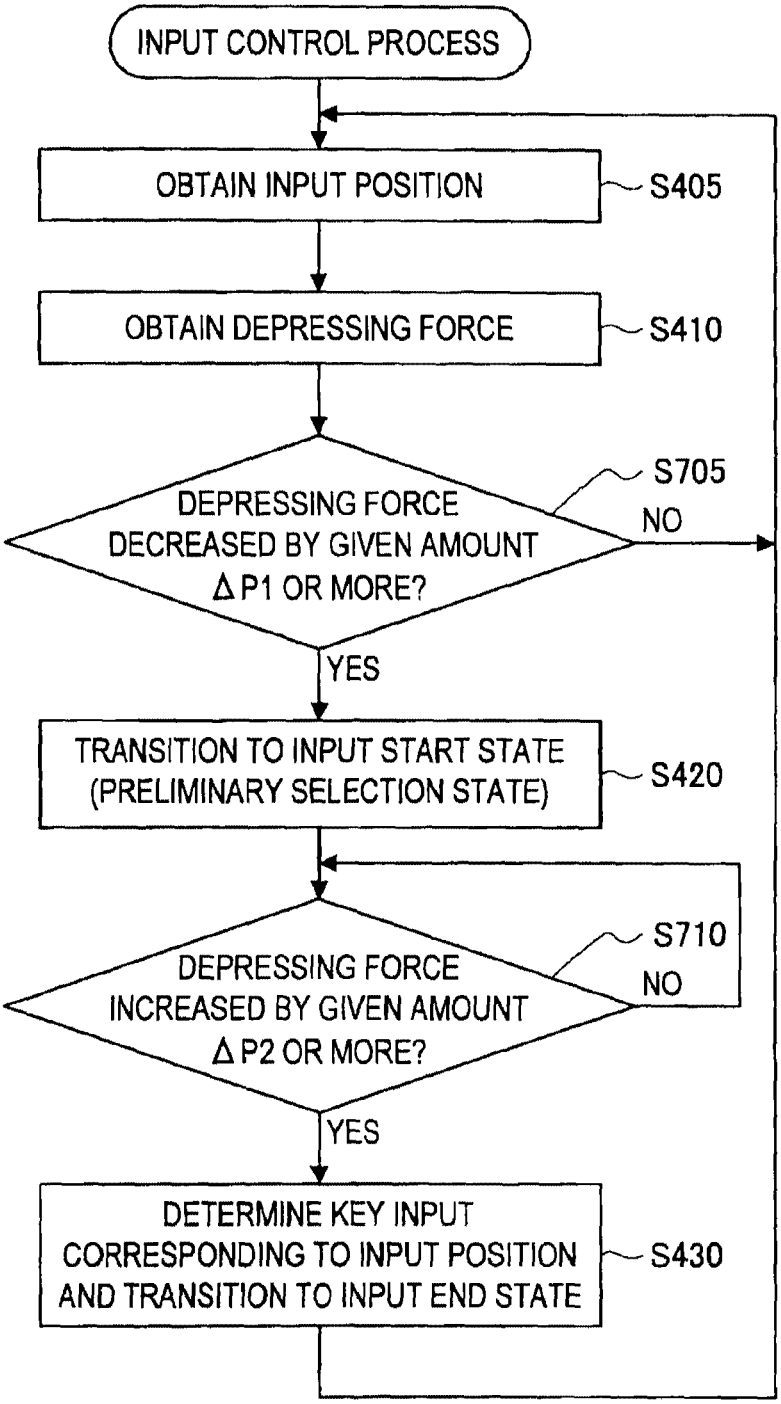
FIG. 7 is a flowchart showing an input control process example 2.
Figure 8:
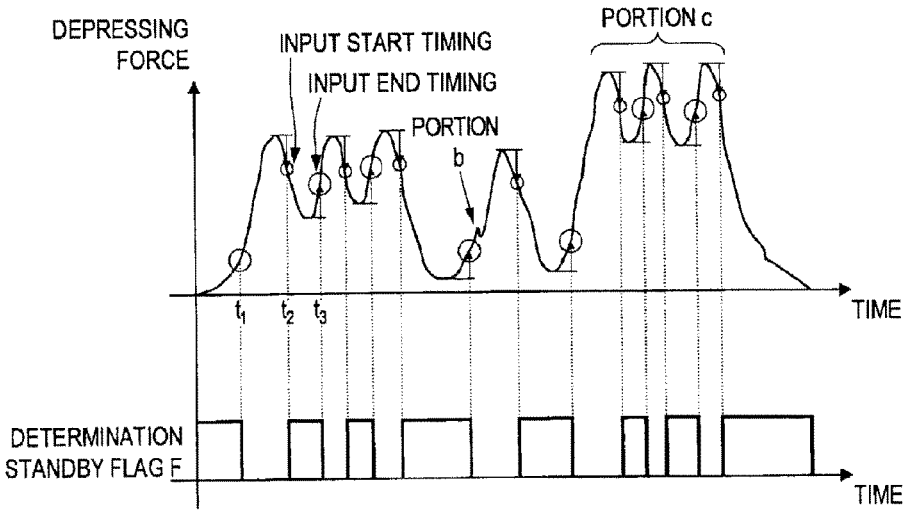
FIG. 8 is a graph for explaining a transition of a state of a selected input candidate in the input control process in FIG. 7.

The input candidate determination operation not including lock and unlock operations of an input candidate will be described now, with reference to FIGS. 4 to 8 before description of the lock and unlock operations, which are a feature of an input control method in this embodiment. FIGS. 4 to 6 are a flowchart and diagrams each showing a transition of a depressing force, for explaining an input control process example 1. FIGS. 7 and 8 are a flowchart and a diagram showing a transition of a depressing force, for explaining an input control process example 2. Lock and unlock processes in this embodiment constitute the operation prior to the input candidate determination operation. A preliminary selection process and an input determination process constitute the input candidate determination operation.

When the input control process in FIG. 4 is started, the input position acquisition unit 210 obtains X and Y coordinates of a position of the touch panel 120 touched by an operating finger, as an input position, in step S405. Next, the depressing force acquisition unit 200 obtains the depressing force of the operating finger which depresses the touch panel 120, in step S410.

Next, the input control unit 220 determines whether or not the depressing force has exceeded the input start threshold value 240a, in step S415. When it is determined that the depressing force has not exceeded the input start threshold value 240a, the operation is returned to step S405, and the processes in steps S405 to S415 are executed again.

When it is determined in step S415 that the depressing force has exceeded the input start threshold value 240a, the operation proceeds to step S420 to cause transition of a key at the input position to an input start state (preliminary selection state or determination standby state). A time $t_1$ in FIG. 5 indicates a timing of preliminary selection of the key, or a timing at which the transition to the determination standby state has been made. In response to this timing, the display control unit 230 may show the preliminary selection state to a user as shown in FIG. 2 in which the pop-up display of the character "e" is highlighted.

Next, the operation proceeds to step S425, in which the input control unit 220 determines whether or not the depressing force has fallen below the input end threshold 240b. The input end threshold value 240b is set to be smaller than the input start threshold value 240a.

While it is determined that the depressing force is not below the input end threshold value 240b, the input control unit 220 repeats the process in step S425. When it is determined that the depressing force has fallen below the input end threshold value 240b, the operation proceeds to step S430. The input control unit 220 causes the key to transition to an input end state (standby finish state) in step S430. That is, the input control unit 220 determines input of the key corresponding to the input position, and causes the input operation of the key to be finished. A time $t_2$ in FIG. 5 indicates a timing at which input of the key corresponding to the position of touch by the operating finger has been determined and the transition to the standby finish state has been made. At this timing, the pop-up display of the key "e" in FIG. 2, for example, is finished, and the mobile apparatus 10 receives subsequent input of a character.

Assume, for example, that the depressing force has exceeded the input start threshold value 240a at a time $t_1$ in FIG. 6, and then the depressing force has exceeded the input start threshold value 240a again before falling below the input end threshold value 240b, as shown in a waveform portion a of an electrical signal indicating the depressing force in FIG. 6. Then, input is not determined, because the mobile apparatus 10 is not in a state of receiving determination of subsequent input yet. When the depressing force has fallen below the input end threshold value 240b at a time $t_2$, the input is determined, and the mobile apparatus 10 transitions to the state of receiving a subsequent input operation. When the depressing force exceeds the input start threshold value 240a again at a time $t_3$ in the subsequent input operation, a key corresponding to an input position at that time is preliminarily selected. When the depressing force has fallen below the input end threshold value 240b again, input of the key corresponding to the input position at that time is determined, and the mobile apparatus 10 becomes the state of receiving subsequent input of a character.

By performing enlarged display and display of selection of a key (highlighted display of the key) on the screen as shown in FIG. 2 during the operation, visual feedback for notifying each of the timings to the user may be performed. In addition to this method of the visual feedback, another method may be used for notifying each of the timings to the user. That is, a vibration device such as a vibration motor is included in the mobile apparatus 10, and the surface of the touch panel is vibrated by the vibration device at each timing to notify the timing to the user. These methods are effective for achieving an intuitive operation.

As described above, the input control process example 1 may prevent successive input determinations of unintended characters. This phenomenon occurs when a depressing force hovers around the input start threshold value 240a, for example. Due to a subtle variation of the depressing force and noise of the electrical signal in this condition, the depressing force frequently exceeds the input start threshold value, so that the successive input determinations of unintended characters occur.

Further, according to the input control process example 1, the preliminary selection state of a key is shown to the user by highlighted display of a pop-up character or the like. With this arrangement, the user may adjust a degree of depression and may perform input determination after confirming that an intended button has been selected. A touch error may be thereby reduced. Further, even when the size of the button is small with respect to the operating finger or the size of a stylus, selection and input determination operations of the button may be correctly performed.

[1-4. Input Control Process Example 2]

In the input control process example 1 in FIG. 4, the determination operation of input by depression is controlled using the absolute value of the depressing force. In place of this method, there may be a method of controlling the input determination operation according to a depressing force variation, as in the following input control process example 2 in FIG. 7. A description will be given below about an example where the input determination operation is controlled according to a depressing force variation, with reference to FIG. 7.

When the input control process in FIG. 7 is started, the input position acquisition unit 210 obtains X and Y coordinates of a position of the touch panel 120 touched by an operating finger, as an input position, in step S405. Next, the depressing force acquisition unit 200 obtains the depressing force of the operating finger which depresses the touch panel 120, in step S410.

Next, the input control unit 220 determines whether or not the depressing force has changed by a given amount (ΔP1) or more after the depressing force has started to decrease. When it is determined that the depressing force has not decreased by the given amount (ΔP1) or more, the operation is returned to step S405. Then, the processes in steps S405, S410, and S705 are executed again.

When it is determined in step S705 that the depressing three has decreased by the given amount (ΔP1) or more, the operation proceeds to step S420. Transition to the input start state (preliminary selection state or determination standby state) is then made. A time $t_2$ in FIG. 8 indicates a timing of preliminary selection of a key, a timing at which the transition to the determination standby state has been made, or a timing at which a determination standby flag F has risen to 1 (F=1). The display control unit 230 may highlight the pop-up display of the character "e" shown in FIG. 2, in response to this timing.

Next, the operation proceeds to step S710, in which the input control unit 220 determines whether or not the depressing force has changed by a given amount (ΔP2) or more after the depression has started to increase. While it is determined that the depressing force has not increased by the given amount (ΔP2) or more, the input control unit 220 repeats the process in step S710. When it is determined that the depressing force has increased by the given amount (ΔP2) or more, the operation proceeds to step S430. The input control unit 220 determines input of the key corresponding to the input position in step S430, and causes the input operation of the key to be finished (to the input end state). Then, the determination standby flag is lowered to 0 (F=0). A time $t_3$ in FIG. 8 indicates a timing at which input of the key corresponding to the position of touch by the operating finger has been determined and transition to the input end state has been made. Even if the depressing force increases, the determination operation of an input key is not generated until the depressing force decreases again by the given amount (ΔP1) or more. This arrangement may prevent input of an unintended key with respect to a minute variation of the depressing force caused by noise shown in a waveform portion b of an electrical signal indicating the depressing force in FIG. 8.

When the base level of the variation of the depressing force has risen as shown in a waveform portion c in FIG. 8 in the input control process example 2 described above, however, the depressing force does not fall below the input end threshold value, thus not allowing successive inputs to be performed. On contrast therewith, in input control process example 1 described above, input determination is controlled by the absolute value of a depressing force. Thus, input determination may be reliably performed by a small variation of the depressing force. Then, the mobile apparatus 10 may be promptly brought into the state of receiving subsequent character input.

In the process of executing the input determination operation based on the depressing force after the operator has confirmed the input button (input key) in the preliminary selection state, the position of the operating finger may unintentionally change. In that case, the operator may unintentionally input a different button which is present in the proximity of the button in the preliminary selection state even if either of the input control methods described above is used.

[1-5. Operation of Mobile Apparatus]

(Input Control Process)

Figure 9:
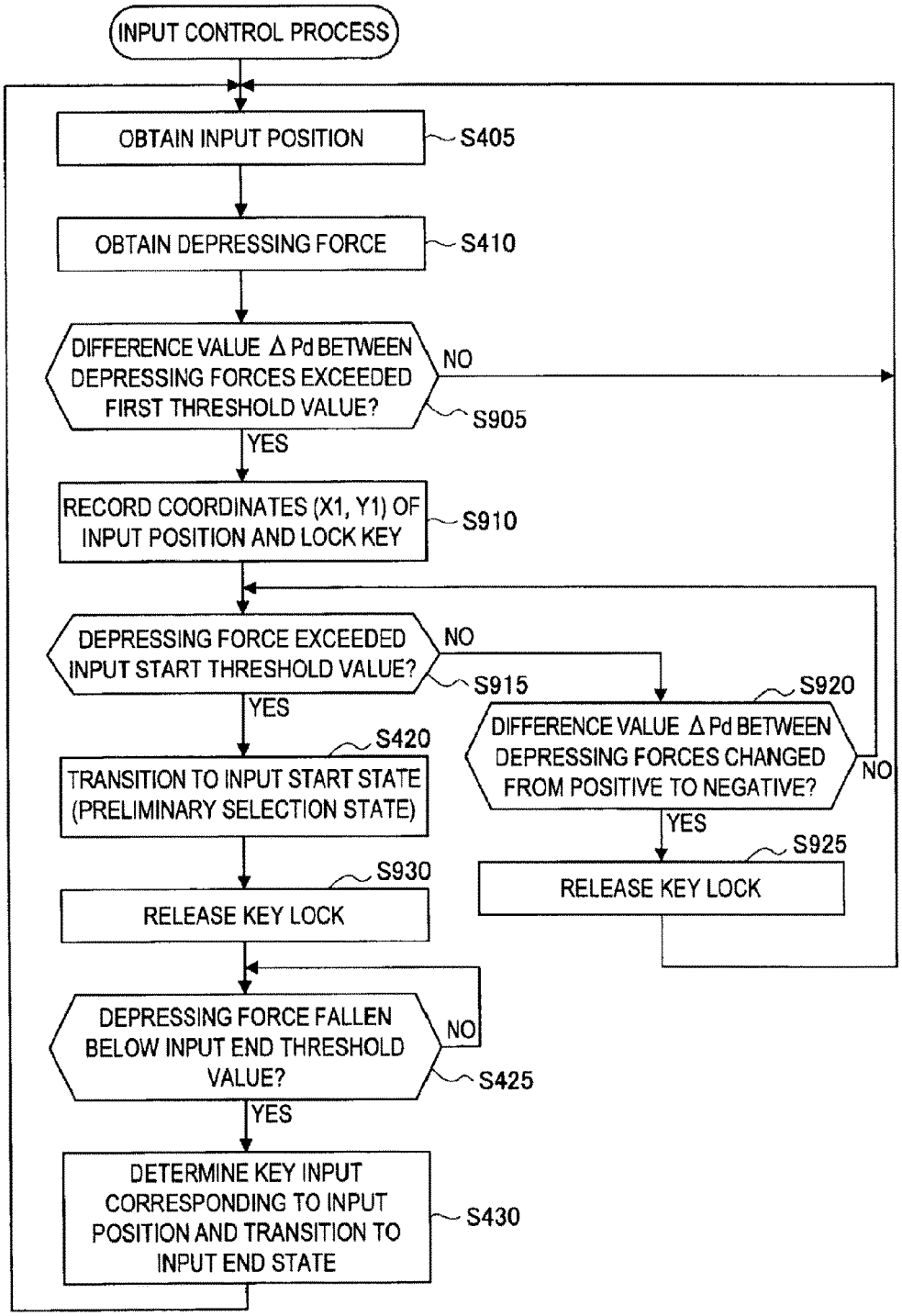
FIG. 9 is a flowchart showing an input control process according to the first embodiment.

To cope with this problem, the mobile apparatus 10 in this embodiment performs the lock operation at the stage prior to the input candidate determination operation, thereby preventing erroneous depression of an input button due to an input position deviation when input button depression is determined. Such an input control method will be described with reference to FIGS. 9 and 10. FIG. 9 is a flowchart and FIG. 10 includes diagrams each showing a transition of a depressing force, for explaining the input control process in this embodiment.

When the input control process in FIG. 9 is started, an input position is obtained in step S405, and the depressing force of an operating finger which depresses the touch panel 120 is obtained in step S410. Next, the input control unit 220 determines whether or not a differential value of the depressing force of an operator has exceeded the predetermined first threshold value 240c. The differential value of the depressing force of the operator is a difference value (ΔPd: change amount of the depressing force) between a depressing force obtained at an immediately preceding time and the depressing force obtained at a current time When it is determined that the difference value has not exceeded the predetermined first threshold value 240c, the operation is returned to step S405, and the processes in steps S405, S410, and S905 are executed.

Figure 10:
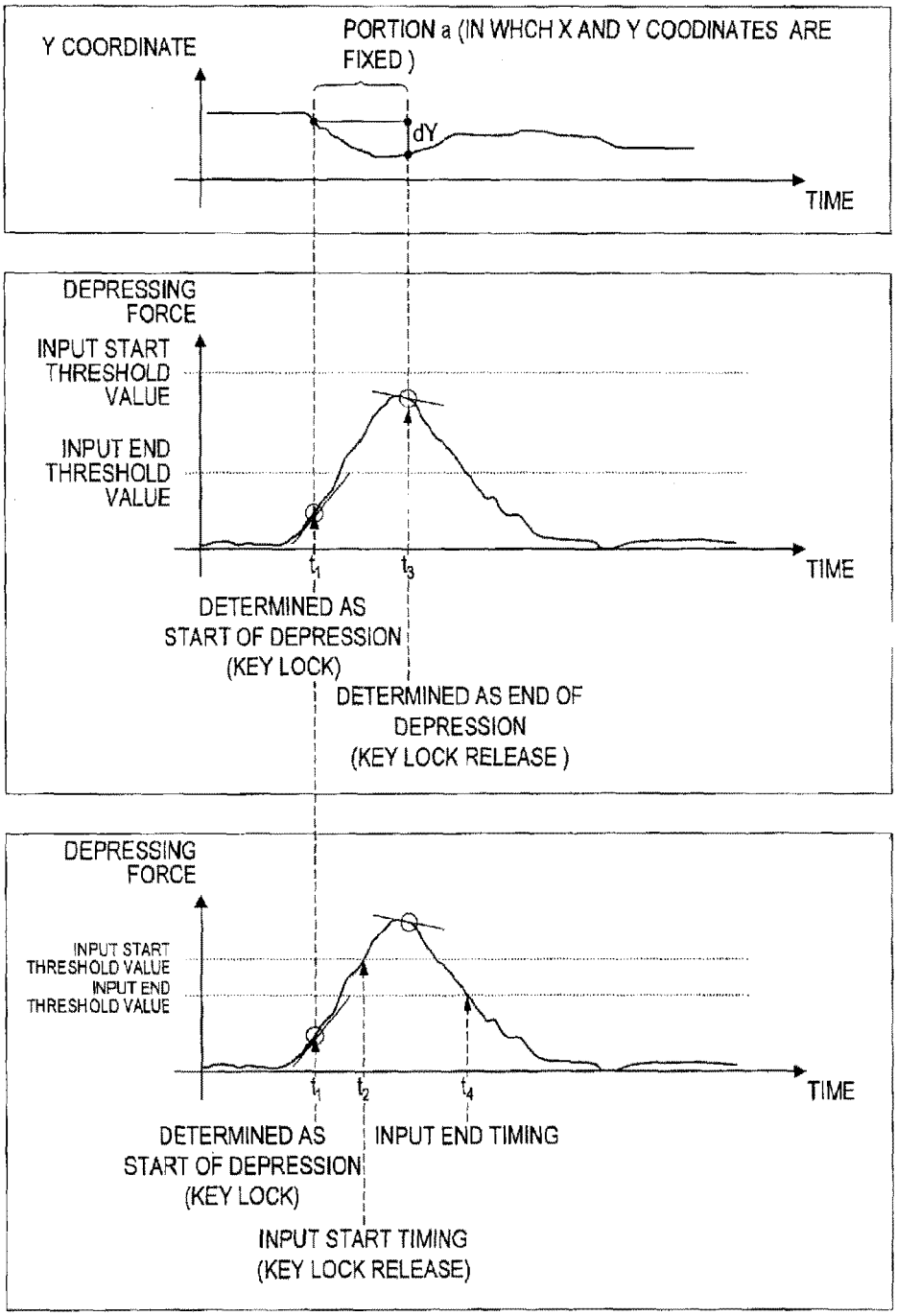
FIG. 10 includes graphs for explaining a transition of a locked state of an input candidate locked state in the input control process in FIG. 9.

When the depressing force increases and then it is determined in step S905 that the difference value ΔPd of the depressing force has exceeded the first threshold value 240c, the input control unit 220 determines that the operator is in a state of performing input by depression. The operation then proceeds to step S910, and the input control unit 220 records X and Y coordinates (X1, Y1) of the input position in the recording unit 240 as the position of an input candidate. By this process, a function of the input control unit 220 of fixing the input position as the position of the input candidate at a predetermined timing is executed at the stage prior to the input candidate determination operation of determining the input candidate as input information. Referring to FIG. 10, a time $t_1$ is a timing at which it has been determined that the depression operation was started and an input key was then locked.

With this arrangement, the input key is locked. For this reason, even if the operator has further depressed the button (key) and the Y coordinate of the input position has thereby slightly changed just by dY as in a signal waveform portion a in the diagram in the upper portion of the page of FIG. 10, this coordinate change is not reflected on subsequent operations for the input. This arrangement solves the problem of depression of an unintended button due to an input position deviation at a time of input button depression and resulting input of the key corresponding to the unintended button. The magnitude of the first threshold value 240c is set to exceed the magnitude of a depressing force variation (increase) caused by each of a usual sliding operation of the finger and noise.

Next, the input candidate determination operation is entered. The input control unit 220 determines whether the depressing force has exceeded the input start threshold value 240a, in step S915. When it is determined that the depressing force has exceeded the input start threshold value 240a, the operation proceeds to step S420 to cause the key to transition to the input start state (preliminary selection state), and then, locking of the input key is released in step S930. That is, fixing of the coordinates of the input position performed in step S910 is canceled at this timing. With this arrangement, the operator may execute the determination operation of key input. A time $t_2$ in the diagram in the lower portion of the page of FIG. 10 is a timing at which the key locking has been released.

When it is determined in step S915 that the depressing force has not exceeded the input start threshold value 240a, the operation proceeds to step S920 to determine whether or not the difference value ΔPd of the depressing force has changed from a positive value to a negative value. When it is determined that the difference value ΔPd of the depressing force has not changed from the positive value to the negative value, the operation is returned to step S915. On the other hand, when it is determined that the depressing force has changed from the positive value to the negative value, the operation proceeds to step S925 to determine the depression operation has been finished without transition of the input key to the input start state (preliminary selection state). Locking of the key is therefore released, and the operation is returned to step S405. A time $t_3$ in the diagram in the middle portion of the page of FIG. 10 is a timing at which locking of the key has been released. With this arrangement, the mobile apparatus 10 may receive a subsequent input operation without performing input determination when the operator stops the input operation in the middle of the input operation.

When the input control unit 220 determines whether or not the depressing force has fallen below the input end threshold value 240b in step S425 and determines that the depressing force has fallen below the input end threshold value 240b, the same process as that described above is performed. That is, the operation proceeds to step S430, and transition to the input end state is made. Input of the key corresponding to the input position is determined, and the input operation of the key is finished. A time $t_4$ in the diagram in the lower portion of the page of FIG. 10 is a timing at which the input determination has been made, and then the input has been finished.

As described above, in an input operation of an apparatus using a touch panel or a touch pad in which input determination is made according to a depressing force variation, when button depression intended for input determination is performed, erroneous button depression may often occur due to an unintentional change in coordinates of a position of input by a finger at a time of a depressing force increase. On contrast therewith, in the input control method of the mobile apparatus 10 in this embodiment, coordinates of a key being depressed is locked for a predetermined period of time, using information on the depressing force of the key. With this arrangement, erroneous button depression caused by an unintentional input position deviation of a finger after locking of the key may be prevented, so that an efficient and high-speed input operation using a desired depression operation may be implemented. Further, according to this embodiment, after an input candidate position has been fixed, fixing of the input candidate position is canceled in response to a timing at which the depressing force has started to decrease after having increased, or in response to a timing at which the depressing force has exceeded the input start threshold value. With this arrangement, when an operator stops an input operation in the middle of the input operation, key locking is intentionally released by changing the depressing force from a positive value to a negative value. The mobile apparatus 10 may thereby receive a subsequent input operation without making input determination.

Second Embodiment

2-1. Operation of Mobile Apparatus

Figure 11:
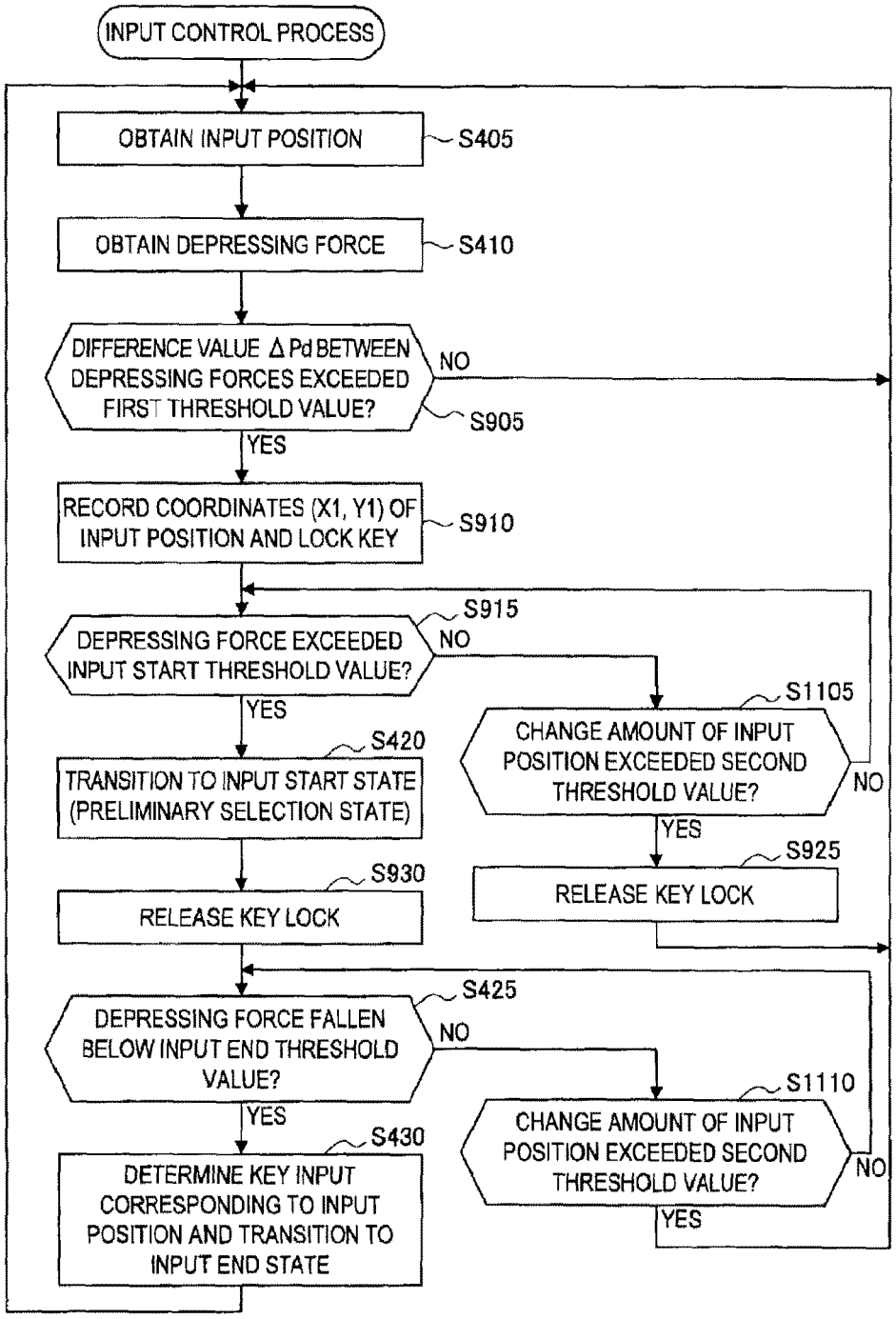
FIG. 11 is a flowchart showing an input control process in a second embodiment.
Figure 12:
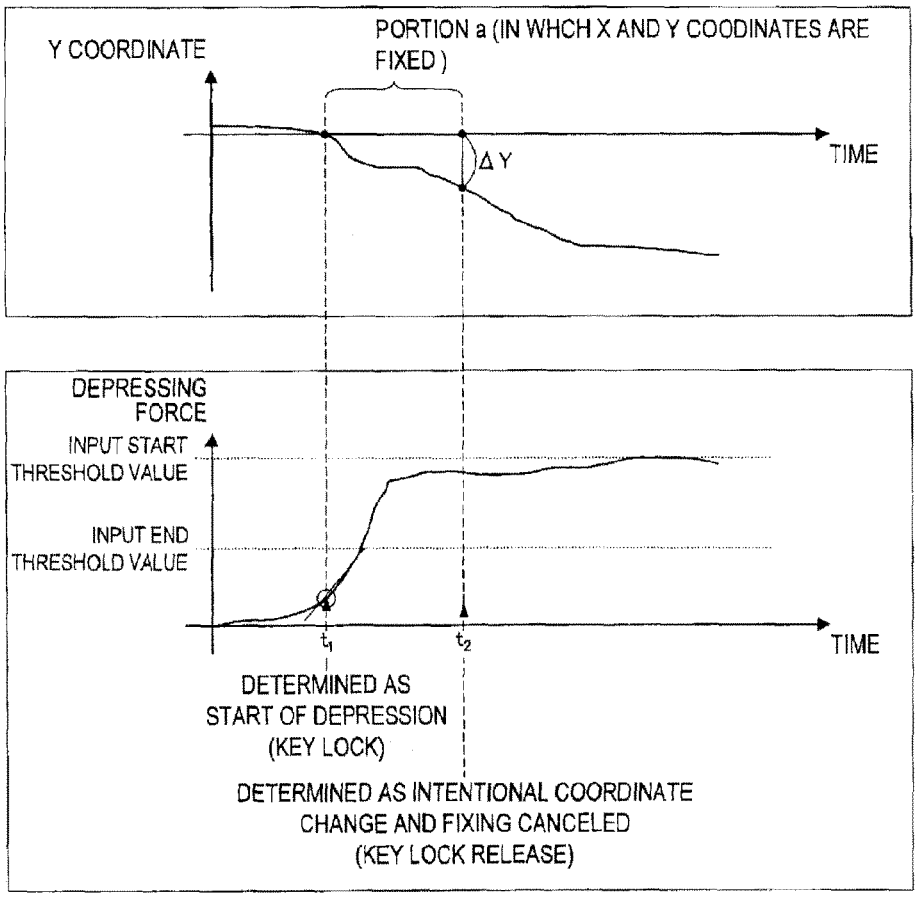
FIG. 12 includes graphs for explaining a transition of a locked state of an input candidate locked state in the input control process in FIG. 11.

Next, an input control method which is executed in the mobile apparatus 10 in a second embodiment will be described with reference to FIGS. 11 and 12. FIG. 11 is a flowchart, and FIG. 12 includes diagrams each showing a transition of a depressing force, for explaining an input control process in this embodiment. The second embodiment prevents erroneous button depression which may occur due to an unintentional change in coordinates of a position of input by a finger of an operator at a time of a depressing force increase. Further, the second embodiment solves a problem that the coordinates of an input position is fixed though the operator does not intend to fix the coordinates of the input position.

(Input Control Process)

When the input control process in FIG. 11 is started, an input position is obtained in step S405 and the depressing force of an operating finger which depresses the touch panel 120 is obtained in step S410. Next, the input control unit 220 determines whether or not the difference value ΔPd (increase amount) between a depressing force obtained at an immediately preceding time and the depressing force obtained at a current time, which is a differential value of the depressing force of an operator, has exceeded the predetermined first threshold value 240c. When it is determined that the difference value ΔPd has not exceeded the predetermined first threshold value 240c, the operation is returned to step S405, and the processes in steps S405, S410, and S905 are executed.

When it is determined in step S905 that the difference value ΔPd of the depressing force has exceeded the predetermined first threshold value 240c, the input control unit 220 determines that the operator is going to perform input by depression. The operation then proceeds to step S910, and the input control unit 220 records X and Y coordinates (X1, Y1) of the input position in the storage unit 240. Referring to FIG. 12, a time $t_1$ is a timing at which it has been determined that the depression operation was started and an input key was then locked.

The input key is thereby locked. For this reason, even if the operator has further depressed the button (key) and the coordinate of the input position has thereby slightly changed, this coordinate change is not reflected on subsequent operations for the input. This arrangement solves the problem of depression of an unintended button caused by an input position deviation at a time of input button depression and resulting unintentional input of the key corresponding to the button.

Next, the input candidate determination operation is entered. The input control unit 220 determines whether or not the depressing force has exceeded the input start threshold value 240a, in step S915. When it is determined that the depressing force has exceeded the input start threshold value 240a, the operation proceeds to step S420 to cause the key to the input start state (preliminary selection state). Then, locking of the input key is released in step S930. That is, fixing of the coordinates of the input position performed in step S910 is canceled at this timing.

On the other hand, when it is determined that the depressing force has not exceeded the input start threshold 240a in step S915, the operation proceeds to step S1105. Then, the input control unit 220 determines whether or not a change amount of the input position has exceeded the second threshold value 240d. When it is determined that the change amount of the input position has not exceeded the second threshold value 240d, the operation is returned to step S915. When it is determined that the change amount of the input position has exceeded the second threshold value 240d, the operation proceeds to step S925. The input control unit determines that the coordinate value change of the input position is intended by the operator. Then, locking of the key is released. The operation is then returned to step S405. Assume that an amount of change ΔY in the Y coordinate of the input position in a waveform portion a in FIG. 12 has gradually increased and has then exceeded the second threshold value 240d at a time t2. In this case, locking of the key is released at the time $t_2$ in this embodiment. With this arrangement, the mobile apparatus 10 may receive a subsequent input operation without making input determination when the operator stops the input operation in the middle of the input operation. The description using FIG. 12 was directed to the case of the amount of change in the Y coordinate. A similar operation may be used when a change in the X coordinate occurs. That is, also when an amount of change in the X coordinate has exceeded a predetermined threshold value (ΔX), locking of the key is released. Each of threshold values ΔX and ΔY as the second threshold value 240d is determined, based on the magnitude of deformation of the finger or the magnitude of a coordinate displacement caused by an input position deviation when the finger has normally depressed a button (key).

When the input control unit 220 determines whether or not the depressing force has fallen below the input end threshold value 240b in step S425 and determines that the depressing force has fallen below the input end threshold value 240b, the same process as that described above is performed. That is, the operation proceeds to step S430, input of the key corresponding to the input position is determined, and transition to the input end state is made, thereby finishing the input operation of the key.

As described above, according to this embodiment, after an input candidate position has been fixed, fixing of the input candidate position is canceled in response to a timing at which an input position change amount has exceeded the second threshold value or a timing at which the depressing force has exceeded the input start threshold. This arrangement may prevent erroneous button depression which may occur due to an unintentional change in the coordinates of the position of input by a finger at a time of a depressing force increase when input button depression intended for determination is performed. Further, with this arrangement, key locking is released by intentionally changing a touch position. This release of key locking may solve the problem that the coordinates of an input position is fixed though an operator does not intend to fix the coordinates of the input position.

Third Embodiment

3-1. Operation of Mobile Apparatus

Figure 13:
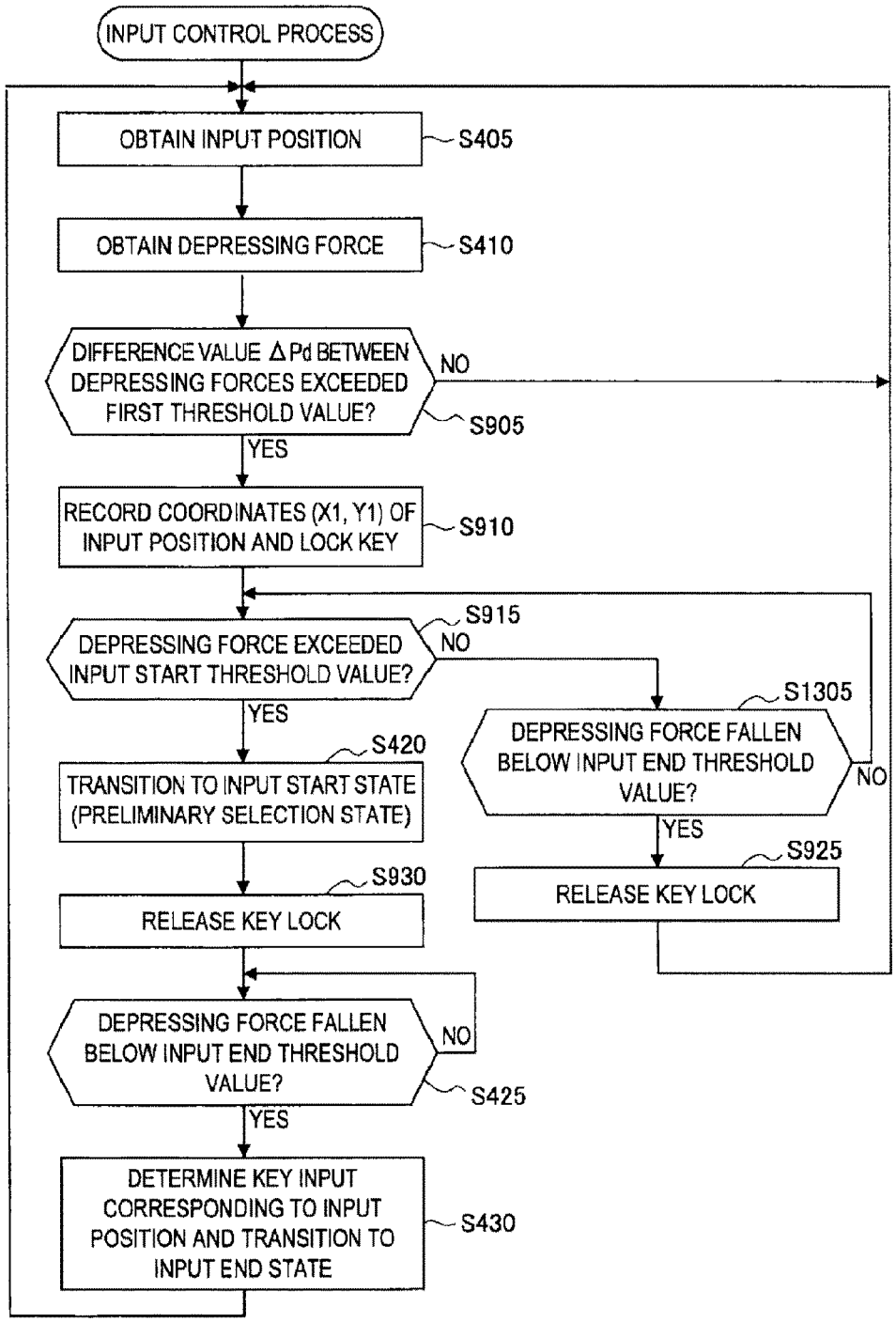
FIG. 13 is a flowchart showing an input control process according to a third embodiment.

Next, an input control method which is executed in the mobile apparatus 10 in a third embodiment will be described with reference to FIGS. 13 and 14. FIG. 13 is a flowchart, and FIG. 14 includes diagrams each showing a transition of a depressing force, for explaining an input control process in this embodiment.

In the first embodiment, locking of the key is released at the time t3 as shown in FIG. 10, too. Accordingly, fixing of the key is generally cancelled when a coordinate deviation of an input position (a difference dx or dy between the coordinate at the start of the fixing and the coordinate at the end of the fixing) is close to the maximum. For that reason, a large jump may occur in the coordinates of the input position immediately after the cancellation of the fixing. In the case of a keyboard, for example, pop-up of a different key is likely to be displayed immediately after the cancellation of the fixing has been made. The third embodiment solves the problem of a coordinate jump which may occur when such fixing of a key is canceled.

(Input Control Process)

When the input control process in FIG. 13 is started, an input position is obtained in step S405 and the depressing force of an operating finger which depresses the touch panel 120 is obtained in step S410. Next, the input control unit 220 determines whether or not the difference value ΔPd (increase amount) between a depressing force obtained at an immediately preceding time and the depressing force obtained at a current time has exceeded the predetermined first threshold value 240c, in step S905. When it is determined that the difference value ΔPd has not exceeded the predetermined first threshold value 240c, the operation is returned to step S405, and the processes in steps S405, S410, and S905 are executed.

When it is determined that the difference value ΔPd has exceeded the predetermined first threshold value 240c in step S905, the input control unit 220 determines that an operator is going to perform input by depression. Then, the operation proceeds to step S910, and the input control unit 220 records X and Y coordinates (X1, Y1) of the input position in the storage unit 240. Referring to FIG. 14, a time $t_1$ is a timing at which it has been determined that the depression operation was started and the input key was then locked.

The input key is thereby locked. For this reason, even if the operator has further depressed the button (key) and the coordinate of the input position has slightly changed, this coordinate change is not reflected on subsequent operations for the input. With this arrangement in this condition, the problem of depression of an unintended button due to an input position deviation at a time of input button depression and resulting input of the key corresponding to the unintended button is solved.

Next, the input candidate determination operation is entered. The input control unit 220 determines whether or not the depressing force has exceeded the input start threshold value 240a, in step S915. When it is determined that the depressing force has exceeded the input start threshold value 240a, the operation proceeds to step S420 to cause the input key to transition to the input start state (preliminary selection state). Then, locking of the input key is released in step S930. That is, fixing of the coordinates of the input position performed in step S910 is canceled at this timing.

When it is determined in step S915 that the depressing force has not exceeded the input start threshold value 240a, the operation proceeds to step S1305. Then, the input control unit 220 determines whether or not the depressing force has fallen below the input end threshold value 240b. When it is determined that the depressing force has not fallen below the input end threshold value 240b, the operation is returned to step S915. On the other hand, when it is determined that the depressing force has fallen below the input end threshold value 240b, the input control unit 220 determines that the coordinate value change of the input position is intended by the operator. The operation proceeds to step S925, in which locking of the key is canceled. Then, the operation is returned to step S405.

Figure 14:
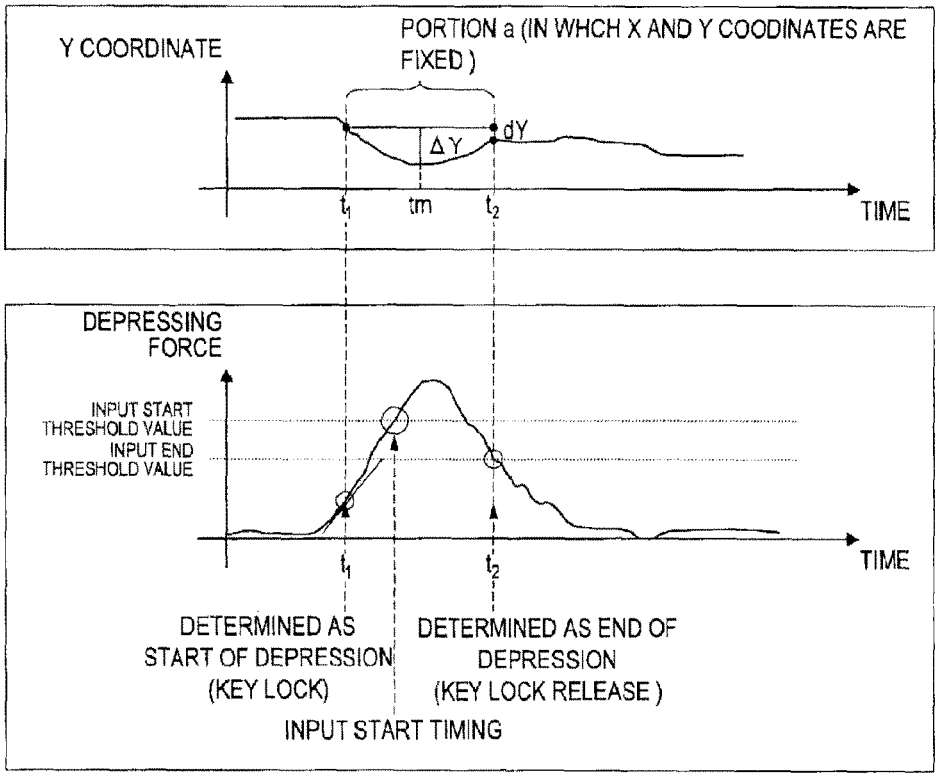
FIG. 14 includes graphs for explaining a transition of a locked state of an input candidate in the input control process in FIG. 13.

It can be seen from a signal waveform portion a in FIG. 14 that a deviation (change amount) of the input position gradually decreases after the deviation has increased. Accordingly, a deviation dY at a time $t_2$ is reduced from a maximum value ΔY of the deviation at a time tm. Thus, locking of the key is released at the time $t_2$ in this embodiment. This arrangement may solve the problem of a large jump in the coordinate of an input position which may occur at a moment when an operator stops an input operation in the middle of the input operation.

The input control unit 220 determines whether or not the depressing force has fallen below the input end threshold value 240b, in step S425. When it is determined that the depressing force has fallen below the input end threshold value 240b, the operation proceeds to step S430 to determine input of the key corresponding to the input position. The input control unit causes the key to transition to the input end state, thereby finishing the input operation of the key. The processes in steps 425 and 430 are the same as those described above.

A timing at which coordinate fixing (locking of the key) is cancelled after an input start timing may be a timing at which the depressing force has fallen below the input end threshold value 240b. Alternatively, the timing at which the coordinate fixing is cancelled may be a timing at which the depressing force has fallen below a desired given value. The desired given value may be a third threshold value smaller than the input start threshold value.

As described above, according to this embodiment, fixing of an input candidate position is canceled in response to a timing at which the depressing force has fallen below the third threshold value smaller than the input start threshold value or a timing at which the depressing force has exceeded the input start threshold value after the input candidate position has been fixed. This arrangement may prevent erroneous button depression which may occur due to an unintentional change in the coordinates of the position of input by a finger at a time of a depressing force increase when input button depression intended for determination is performed. This arrangement may further solve the problem of a large jump in the coordinates of the input position when key locking is released.

As described above, according to the input control method using the mobile apparatus in each embodiment, erroneous input button depression due to an input position deviation at a time of an input operation may be prevented, and an efficient and high-speed input operation may be implemented by a desired depression operation.

In each of the embodiments described above, as a basic process of the input candidate determination operation, erroneous input button depression is prevented by adding the lock and unlock processes in each of the embodiments to the input method of input control process example 1 shown in FIG. 4. This basic process, however, is not limited to this process. The lock and unlock processes in each of the embodiments may be added to the input method of input control process example 2 shown in FIG. 7.

The lock and unlock processes in each of the embodiments may be applied to an operation system in which input determination is made at a timing of a start of input and an operation system in which input determination is made at a timing of an end of input (corresponding to determination by a mouse-up, for example). In both cases, a similar effect may be achieved.

In the first to third embodiments described above, the operations of the respective units are related to each other and may be replaced with a series of operations and a series of processes in consideration of the relation to each other. The embodiment of the information processing apparatus can be thereby converted into the embodiment of an input method of the information processing apparatus and the embodiment of a program for causing a computer to implement functions of the information processing apparatus.

Although preferred embodiments of the present disclosure are described in detail above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The present disclosure may be applied to operation of an electronic apparatus such as a remote controller using a touch pad, in which a screen and an operation surface are present at different locations, as well as an electronic apparatus such as a cellular phone including a touch panel. Further, as described above, by using release of locking of input position coordinates when a displacement amount of an operating finger has exceeded the desired threshold value, an input operation for moving input position coordinates with the touch panel or the touch pad kept depressed also becomes possible.

As an example where a touch pad operation is performed by determination of depression, a PC mouse pad with a mechanical switch installed on a back surface thereof may be pointed out. Even in such an operation system, an intuitive determination operation as with the method described above may be performed. When a mechanical switch is used, however, an intermediate state of depression of the mechanical switch may not be detected. Accordingly, a position deviation at a time of depression as described in the present disclosure may not be prevented. The depression determination method of the present disclosure using a touch panel or a touch pad capable of detecting a depressing force is useful as a technique that is more advantageous to other methods.

Input information which is applied to an input operation according to the present disclosure includes numerals and signs as well as characters such as katakanas, hiraganas, kanjis, and English alphabets.

The present disclosure contains subject matter related to that disclosed in Japanese Priority Patent Application JP 2010-196815 filed in the Japan Patent Office on Sep. 2, 2010, the entire content of which is hereby incorporated by reference.

What is claimed is:

1. An information processing apparatus, comprising:

circuitry configured to:

obtain an input position detected with respect to an input operation;

obtain a depressing force detected with respect to the input operation;

fix the input position as a position of an input candidate in response to a *first* timing at which an increase amount of the depressing force has exceeded a first threshold value, at a stage prior to an input candidate determination operation of determining the input candidate as input information; [and]

cancel fixing of the input candidate position, after the position of the input candidate has been fixed, in response to a *second* timing at which the depressing force has started to decrease after having increased[, or]; *and*

*cancel fixing of the input candidate position, after the position of the input candidate has been fixed, in response to* a *third* timing at which the depressing force has exceeded an input start threshold value.

2. An input control method of an information processing apparatus, comprising:

obtaining, using circuitry *of the information processing apparatus*, an input position detected with respect to an input operation;

obtaining, using the circuitry, a depressing force detected with respect to the input operation;

fixing, using the circuitry, the input position as a position of an input candidate in response to a *first* timing at which an increase amount of the depressing force has exceeded a first threshold value, at a stage prior to an input candidate determination operation of determining the input candidate as input information; [and]

cancelling fixing of the input candidate position, using the circuitry, after the position of the input candidate has been fixed, in response to a *second* timing at which the depressing force has started to decrease after having increased[, or]*; and*

*cancelling fixing of the input candidate position, using the circuitry, after the position of the input candidate has been fixed, in response to* a *third* timing at which the depressing force has exceeded an input start threshold value.

3. A non-transitory computer readable storage medium having executable instructions stored thereon[,] which, when executed by *circuitry of* a computer, cause the computer to execute an input control method of an information processing apparatus, comprising:

obtaining, [using] *by* circuitry, an input position detected with respect to an input operation;

obtaining, [using] *by* the circuitry, a depressing force detected with respect to the input operation;

fixing, [using] *by* the circuitry, the input position as a position of an input candidate in response to a *first* timing at which an increase amount of the depressing force has exceeded a first threshold value, at a stage prior to an input candidate determination operation of determining the input candidate as input information; and cancelling fixing of the input candidate position, [using] *by* the circuitry, after the position of the input candidate has been fixed, in response to a *second* timing at which the depressing force has started to decrease after having increased[, or]*; and*

*cancelling fixing of the input candidate position, by the circuitry, after the position of the input candidate has been fixed, in response to* a *third* timing at which the depressing force has exceeded an input start threshold value.

*4. The information processing apparatus according to claim 1, further comprising:*

*a touch panel, wherein*

*the input operation is performed by a user touching the touch panel at the input position with the depressing force, and*

*the circuitry is configured to detect the input operation to obtain the input position and the depressing force.*

*5. The information processing apparatus according to claim 4, wherein*

*the touch panel includes a pressure-sensitive electrically conductive rubber layer, and*

*the pressure-sensitive electrically conductive rubber layer deforms with respect to depression of the touch panel according to the depressing force of the input operation at the input position.*

*6. The input control method according to claim 2, wherein*

*the information processing apparatus includes a touch panel,*

*the input operation is performed by a user touching the touch panel at the input position with the depressing force, and*

*the input control method further comprises detecting, by the circuitry, the input operation on the touch panel to obtain the input position and to obtain the depressing force.*

*7. The input control method according to claim 6, wherein*

*the touch panel includes a pressure-sensitive electrically conductive rubber layer, and*

*the pressure-sensitive electrically conductive rubber layer deforms with respect to depression of the touch panel according to the depressing force of the input operation at the input position.*

* * * * *